J. LINDALL.
RAILWAY CAR.
APPLICATION FILED MAR. 24, 1913.
1,071,644.
Patented Aug. 26, 1913.
2 SHEETS—SHEET 1.
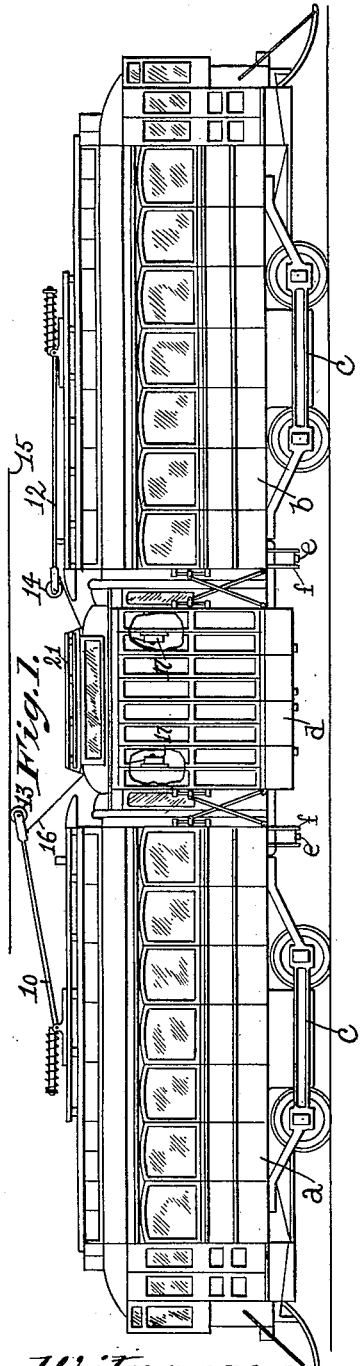
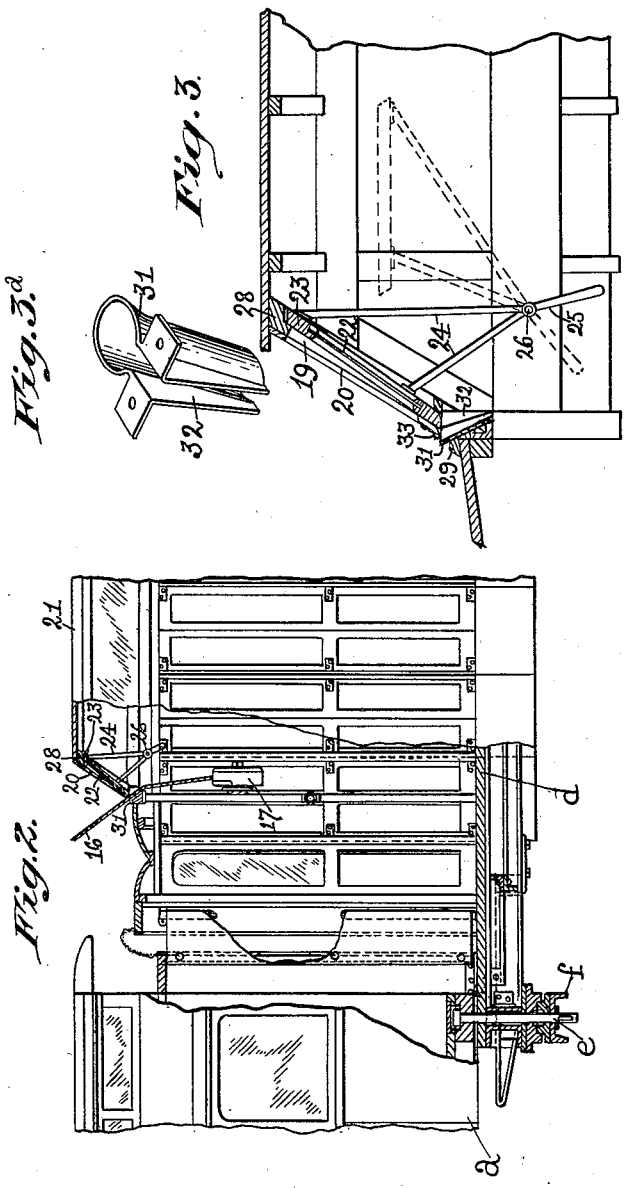
Witnesses:
M. G. Crozier,
J. Murphy
Inventor,
John Lindall
by Jas. H. Churchill
Atty.

J. LINDALL.
RAILWAY CAR.
APPLICATION FILED MAR. 24, 1913.
1,071,644.
Patented Aug. 26, 1913.
2 SHEETS—SHEET 2.
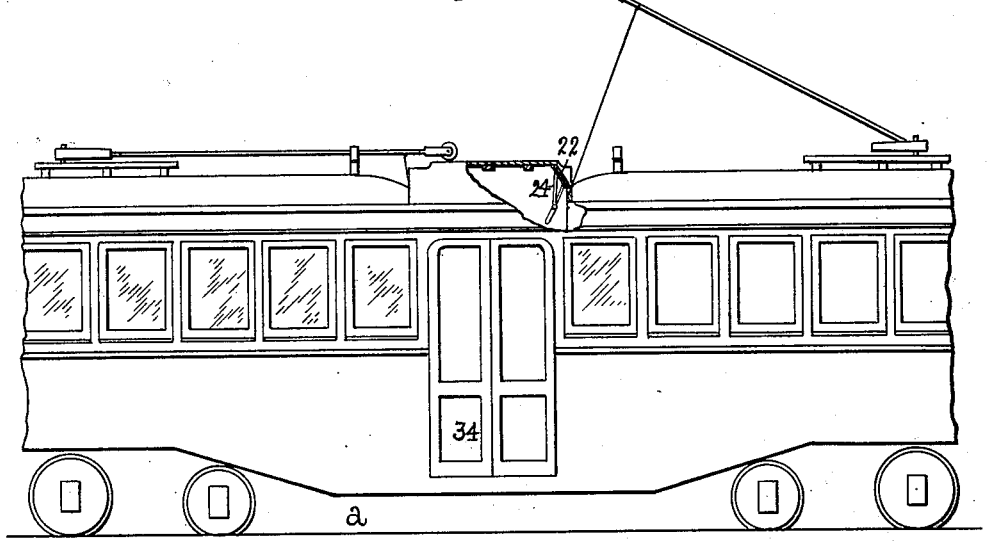
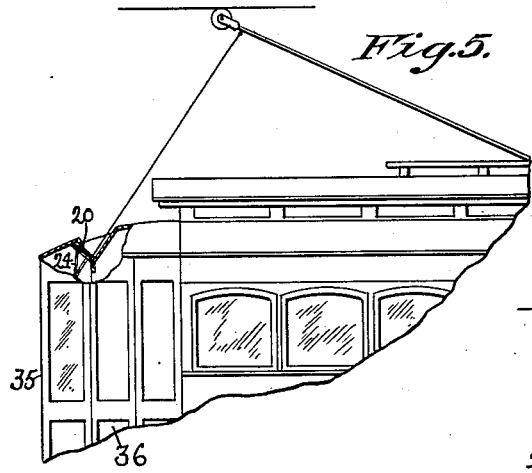
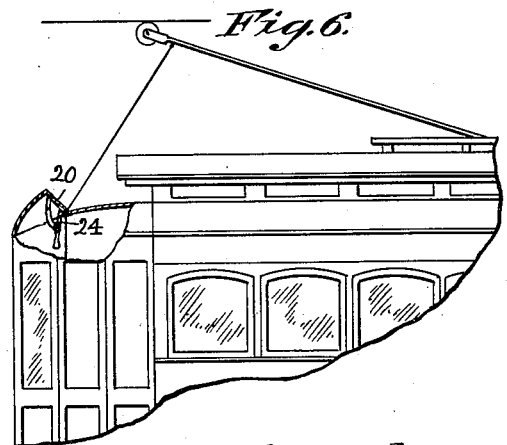
Witnesses:
M. G. Crozier,
J. Murphy
Inventor:
John Lindall
by Jas. H. Churchill
atty.

UNITED STATES PATENT OFFICE.

JOHN LINDALL, OF BOSTON, MASSACHUSETTS.

RAILWAY-CAR.

1,071,644.  Specification of Letters Patent.  Patented Aug. 26, 1913.

Original application filed April 19, 1912, Serial No. 691,869. Divided and this application filed March 24, 1913. Serial No. 756,364.

*To all whom it may concern:*

Be it known that I, JOHN LINDALL, a citizen of the United States, residing in Boston, county of Suffolk, and State of Massachusetts, have invented an Improvement in Railway-Cars, of which the following description, in connection with the accompanying drawings, is a specification, like letters on the drawings representing like parts.

This invention relates to electric railway cars operating on the overhead system, and provided with a trolley pole mounted on the roof of the car and having a contact wheel or device, which makes an under-running contact with an overhead conductor.

The present invention has for its object to provide railway cars of the class described, with a roof construction as will be described, by means of which the trolley rope attached to the trolley pole can be passed into the car so as to be accessible from within the car, and so as to be capable of a substantially lateral movement on opposite sides of the longitudinal center of the car to enable the operator within the car to move the trolley rope laterally so as to replace the trolley wheel upon the trolley wire. To this end, the roof of the car is provided with an opening of substantial length and extended transversely of the car on opposite sides of the longitudinal center line of the roof, so that the operator within the car can move the trolley rope laterally in opposite directions from its normal position substantially in the longitudinal center line of the roof, in order to move the trolley pole laterally to replace the trolley wheel on the trolley wire. The opening referred to is preferably made in an upwardly extended wall forming part of the roof and extended transversely of the car, and has coöperating with it a device for closing the same substantially weather-tight, said device being preferably a window, which is bodily movable in the car and which is opened and closed from within the car. Provision is also made for enabling the trolley rope to run into and out of the car with the window closed. These and other features of this invention will be pointed out in the claims at the end of this specification.

Figure 1 is a side elevation of an electric railway car embodying this invention. Fig. 2, an enlarged detail of a portion of the car shown in Fig. 1. Fig. 3, an enlarged detail of the window in the roof. Fig. 3$^a$, a detail of the guide for the trolley rope, and Figs. 4, 5 and 6, modified forms of cars embodying the invention.

In Fig. 1, I have represented the invention as embodied in one form of car comprising main car body units $a$, $b$, mounted upon trucks $c$ capable of traveling on tracks having curves of short radii, without an abnormal overhang, and an intermediate car body unit $d$, which is pivotally secured to the main car body units to be supported thereby. The intermediate unit $d$ is pivoted at each end by a king bolt $e$ to a cross bolster $f$, secured to the underside of the car body of a main unit, substantially as shown and described in U. S. application Serial Number 691,869 filed by me April 19, 1912, of which this application is a division. The main car body units $a$, $b$ are provided with trolley poles 10, 12, pivotally mounted upon the roofs of said units in the usual manner and carrying trolley wheels 13, 14, which make contact with the trolley wire or overhead conductor 15. Each trolley pole is provided with a trolley rope 16, which is extended into the intermediate unit to be accessible within the latter, and as shown, each trolley rope is connected with a trolley tender 17 of known construction and such as now commonly used on electric railway cars.

The present invention has for its object to provide the electric car with a roof construction as will be described, which will permit the trolley rope to be accessible from within the car, so that the said rope can run into and out of the car under normal conditions of use, and so that it can be moved from within the car laterally with relation to the longitudinal center of the car, when it is desired to replace the trolley wheel on the trolley wire 15. To this end, the intermediate unit $d$ of the multiple unit car shown in Fig. 1 is provided in its roof or overhead portion, with an opening 19 extended transversely of the car on opposite sides of the longitudinal center of the car, and of substantial length. The opening 19 is preferably made in a wall 20, which is extended upwardly and transversely of the car. As shown in Figs. 1 and 2, the wall 20 is inclined upwardly and forms an end wall for the monitor top 21, and the opening 19 is normally closed by a window or like device 22, whose frame 23 is supported so as to be capable of being moved into the car, when it is desired to open the window to enable the trolley rope to be moved laterally in opposite directions from the longitudinal center of the car, which is the normal position of said rope. In the present instance, the window frame 23 is shown as bodily movable into the car, and for this purpose it is secured at each end to forked arms 24 of a lever 25, which is pivoted at 26 to the car frame, and is extended downwardly so as to be accessible to the conductor or other operator within the car.

The window frame 23 is constructed so as to form a substantially weather-tight joint with the window casing, and as shown in Figs. 1, 2 and 3, the upper and lower cross bars of the window engage the under and upper surfaces of the top and bottom cross bars 28, 29, respectively, of the window casing, which, in the present instance is shown as the upright wall 20.

To enable the trolley rope to be taken up and paid out by the trolley tender 17 as is required in service, a passage way or opening for the trolley rope to run in, is provided, which passageway may be made either in the bottom cross bar of the window frame 23 or as is preferred and herein shown, in the bottom cross bar 29 of the window casing 20. The passageway referred to may be made in the form of a groove extending from the upper surface of the bottom cross bar 29 of the window casing to the inner side thereof and open on its inner side, and it is also preferred to insert in said groove a metal bushing or guide 31 (see Figs. 3 and 3ª), which is secured to the cross bar 29 in any suitable manner. The metal bushing or guide 31 is provided with the longitudinal opening 32, through which the trolley rope may be passed into and removed from the bushing or guide, by the operator. The groove referred to is made in the window casing so that, its upper end is open when the window is closed, to permit the trolley rope to run through the groove in opposite directions in the normal working of the car, and the window 23 may have attached to it a flap or device 33, to shed the water from the bushing 31.

When the trolley wheel leaves the trolley wire, the conductor or other operator within the car can replace the trolley wheel on the trolley wire, by opening the window, removing the trolley rope from the guide 31, taking up on the trolley rope so as to lower the trolley wheel below the trolley wire, and then moving the trolley rope laterally in the window opening 19 until the trolley wheel has been brought into line with or beneath the trolley wire, after which the trolley rope is paid out until the wheel engages the wire. The trolley rope is then replaced in its guide 31, and the window closed in bad weather or the window may be left open in good weather for ventilating purposes, if desired.

It will be understood, that the intermediate unit $d$ shown in Fig. 1 is provided with two windows, one at each end of the monitor top 21, and that each opening 19 affords a substantially wide range of movement of the trolley rope laterally of the car on opposite sides of the longitudinal center of the car. It will thus be seen, that the trolley wheel may be replaced on the trolley wire without the operator leaving the car, which not only effects a very considerable saving in time in replacing the trolley, but also avoids loss of fares to the railway company, as the conductor is not obliged to leave the car, consequently the doors are not required to be opened. Another advantage is that the conductor is safeguarded from injury in case of strikes, as he is not obliged to leave the car to replace the trolley wheel, and as the trolley rope is not accessible to a person on the ground, the running of the cars cannot be interfered with by a person in a mob on the ground pulling off the trolley wheel.

In Figs. 1 and 2, I have illustrated one form of electric car embodying the invention, but it is not desired to limit the invention to any particular construction of car, as it is applicable to all classes of cars, whose doors are closed while in transit.

In Fig. 4, the invention is shown in a single unit car having a center entrance 34.

In Figs. 5 and 6, the invention is shown in cars having vestibules 35 provided with doors 36, the wall 20 in which the window opening is made forming part of the roof for the vestibule.

In the constructions shown in Figs. 4, 5 and 6, the window, the means for opening and closing it, and the guide for the trolley rope are the same as above described with relation to Fig. 1.

By the term "roof" as employed in the claims, I desire to be understood as including the roof of the vestibule as well as of the car body.

Claims:

1. In a railway car, in combination, a car having a roof provided with a wall extended upwardly and transversely of the car and having in it an opening extended transversely and on opposite sides of the longitudinal center of the car, a movable window to close said opening substantially watertight, said wall having a guide for a trolley rope through which said rope may run and from which it may be removed from within the car, said guide opening on one side into the transverse opening; a trolley pole mounted upon said car and provided with a trolley rope which is extended into the car through said guide.

2. In a railway car, in combination, a car having a roof provided with a wall extended upwardly and transversely of the car and having in it an opening extended transversely of the car on opposite sides of the longitudinal center of the same, a device to close said opening substantially weather-tight, and means communicating with said opening for permitting a trolley rope to run into and out of the car under normal conditions of use when the device is closed and to enable the trolley rope to be moved into said opening and therein laterally of the car from within the latter when the device is open, to manipulate the trolley rope when it is desired to replace the trolley wheel upon the trolley wire.

3. In a railway car, in combination, a car having a roof provided with a wall extended upwardly and transversely of the car and having in it an opening extended transversely of the car on opposite sides of the longitudinal center of the same, a device for closing said opening substantially weather-tight and bodily movable into the car, means for bodily moving said device from within the car, and means communicating with said opening for permitting a trolley rope to run into and out of the car under normal conditions of use and to enable the trolley rope to be moved into said opening and therein laterally of the car from within the latter, for the purpose specified.

4. In a railway car, in combination, a car having a monitor top provided with an end wall extended upwardly and transversely of the car and having in it an opening extended transversely of the longitudinal center of the car, a window for closing said opening, means within the car for opening said window, and means communicating with said opening for permitting the free passage of a trolley rope into and out of the car when the window is closed, and for permitting said rope to be moved into said opening and therein laterally of the car, for the purpose specified.

5. In a railway car, in combination, a car provided with an opening in its roof extended transversely of the car on opposite sides of its longitudinal center, a trolley pole mounted on said car and having its rope extended into the same to be accessible from within the car, and a guide opening at one side into said transverse opening for permitting said rope to run into and out of the car under normal conditions of use and to enable the trolley rope to be removed therefrom into said transverse opening and to be moved laterally of the car from within the same to manipulate the trolley pole when it is desired to replace the trolley wheel upon the trolley wire and a window to close said transverse opening and leave said trolley rope free to run in said guide, said window being movable into the car to uncover said transverse opening.

6. In a railway car, in combination, a car body having a roof provided with an opening extended transversely of the same, a movable window to close said opening substantially water-tight, and a guide for a trolley rope through which said rope may run when said window is closed and from which it may be removed from within the car body when the window is open, said guide opening at one side into the transverse opening, a trolley pole mounted upon said car and provided with a trolley rope which is extended into the car body through said guide.

7. In a railway car, in combination, a car having a roof provided with an opening extended transversely on opposite sides of the longitudinal center of the same, a device to close said opening substantially weather-tight and bodily movable within the car, a trolley pole mounted upon the car to uncover said opening, a guide opening at one side into said transverse opening and having its rope extended through said guide into the car and removable from said guide into said transverse opening to permit it to be moved laterally of the car in said opening, substantially as described.

In testimony whereof, I have signed my name to this specification in the presence of two subscribing witnesses.

JOHN LINDALL.

Witnesses:
 JAS. H. CHURCHILL,
 J. MURPHY.

---

Copies of this patent may be obtained for five cents each, by addressing the "Commissioner of Patents, Washington, D. C."